(12) United States Patent
Massa et al.

(10) Patent No.: US 8,323,715 B2
(45) Date of Patent: Dec. 4, 2012

(54) METHOD AND EQUIPMENT FOR THE PRODUCTION OF FOOD PRODUCTS FORMED BY COUPLED COMPLEMENTARY PARTS

(75) Inventors: Luciano Massa, Bra (IT); Giovanni Sobrero, Cerretto Langhe (IT)

(73) Assignee: Soremartec S.A., Arlon (BE)

( * ) Notice: Subject to any disclaimer, the term of this patent is extended or adjusted under 35 U.S.C. 154(b) by 272 days.

(21) Appl. No.: 12/599,984

(22) PCT Filed: Feb. 27, 2008

(86) PCT No.: PCT/IB2008/000591
§ 371 (c)(1),
(2), (4) Date: Nov. 13, 2009

(87) PCT Pub. No.: WO2009/007801
PCT Pub. Date: Jan. 15, 2009

(65) Prior Publication Data
US 2010/0303979 A1 Dec. 2, 2010

(30) Foreign Application Priority Data
Jul. 10, 2007 (IT) .............................. TO2007A0503

(51) Int. Cl.
*A23G 1/26* (2006.01)
*A23G 1/54* (2006.01)
(52) U.S. Cl. ........ 426/512; 426/515; 425/120; 425/123; 425/126.1; 425/439; 425/443
(58) Field of Classification Search .......... 426/512–519, 426/68, 307; 99/353, 355, 452, 455, 483, 99/450.4, 450.6, 450.7; 452/410–411, 418, 452/ 423; 425/346, 347, 348 R, 120, 123, 425/126.1, 439, 443; *A23G 1/26, 1/54*
See application file for complete search history.

(56) References Cited

U.S. PATENT DOCUMENTS
2,125,729 A * 8/1938 Kretchmer ................. 425/133.1
(Continued)

FOREIGN PATENT DOCUMENTS
DE 389129 1/1924
(Continued)

*Primary Examiner* — Steven Leff
(74) *Attorney, Agent, or Firm* — Rothwell, Figg, Ernst & Manbeck, P.C.

(57) ABSTRACT

The complementary parts of food products destined to be coupled together are located on the frontal surfaces of half-moulds travelling on two different loop conveyor lines. The first conveyor line extends, at least partially, above the second, so to be included within the surface area occupied by the second line itself. Spatial occupation is further reduced since, downstream to the coupling station, the coupled half-moulds travel with the same spacing step that they had before coupling, with additional advantages in terms of energy absorption and advancing velocity in a successive thermal conditioning station, such as a refrigerating tunnel. One of the half-moulds can be removed upstream to the thermal conditioning station, resulting in an additional reduction in energy absorption since needless subjecting of the half-mould to the thermal cycle to which the products are subjected is avoided.

19 Claims, 1 Drawing Sheet

U.S. PATENT DOCUMENTS

| | | | | | |
|---|---|---|---|---|---|
| 2,487,417 | A | * | 11/1949 | Bianchi | 99/450.2 |
| 3,318,263 | A | * | 5/1967 | Jeffery | 425/261 |
| 3,391,656 | A | * | 7/1968 | Schafer | 425/116 |
| 3,809,774 | A | * | 5/1974 | Raitt | 426/393 |
| 3,940,218 | A | | 2/1976 | Steels | |
| 4,068,993 | A | * | 1/1978 | Dacey et al. | 425/104 |
| 5,180,605 | A | | 1/1993 | Milner | |
| 5,391,387 | A | * | 2/1995 | Peters | 426/512 |
| 7,182,683 | B2 | * | 2/2007 | Shefet | 452/30 |
| 2006/0172672 | A1 | * | 8/2006 | Shefet | 452/30 |

FOREIGN PATENT DOCUMENTS

| | | |
|---|---|---|
| EP | 0083324 A2 | 7/1983 |
| EP | 0583739 A1 | 2/1994 |
| EP | 0583740 A1 | 2/1994 |
| EP | 0736257 A1 | 10/1996 |
| EP | 0766922 A2 | 4/1997 |
| EP | 0923875 A1 | 6/1999 |
| GB | 752478 | 1/1956 |
| JP | 58060949 A | 4/1983 |

* cited by examiner

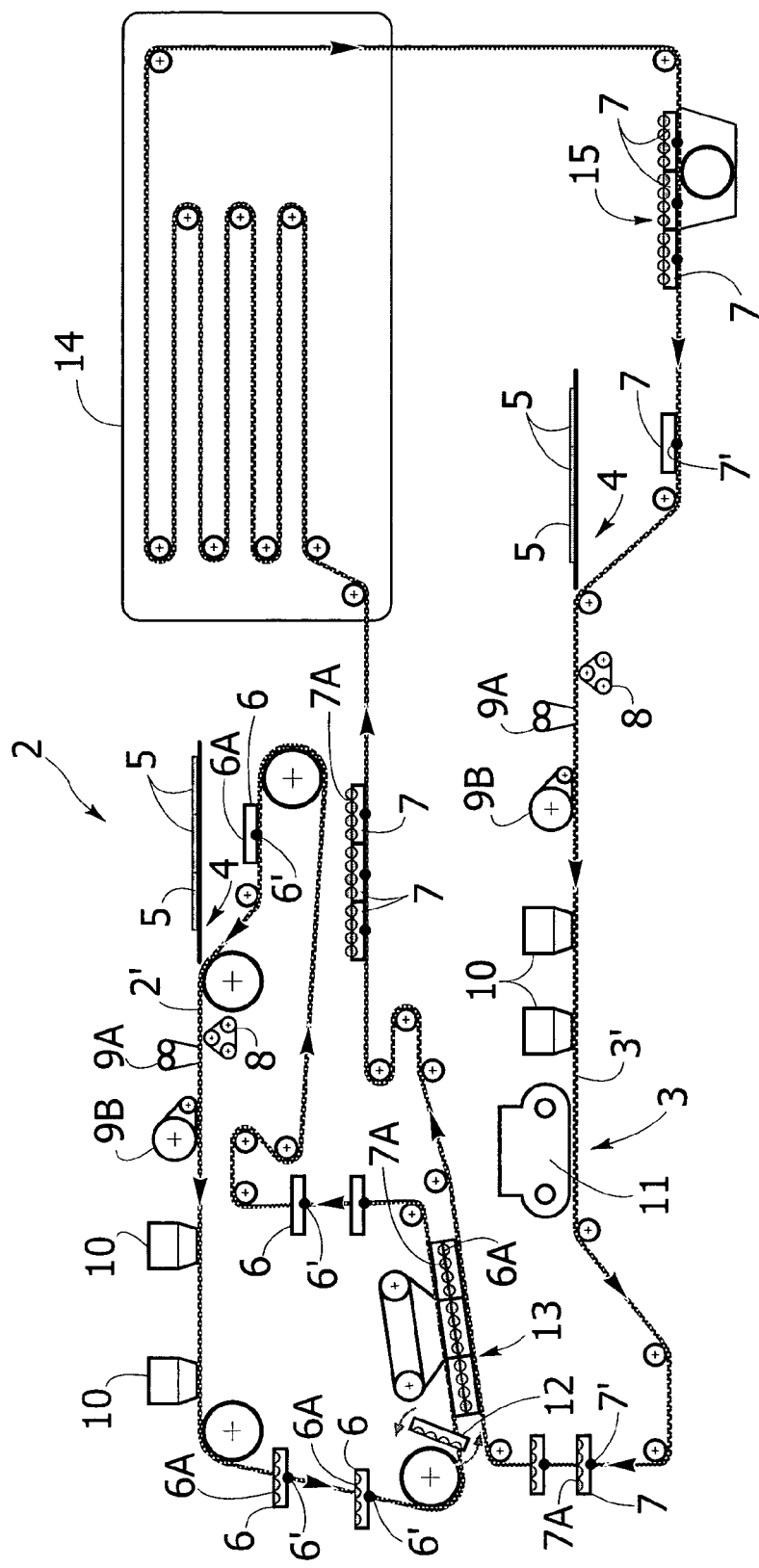

METHOD AND EQUIPMENT FOR THE PRODUCTION OF FOOD PRODUCTS FORMED BY COUPLED COMPLEMENTARY PARTS

CROSS REFERENCE TO RELATED APPLICATION(S)

This application is a 35 U.S.C. §371 National Phase Entry Application from PCT/IB2008/000591, filed Feb. 27, 2008, and designating the United States. This application also claims the benefit of Italian Patent Application No. TO2007A000503 filed Jul. 10 2007, the disclosure of which is incorporated herein in its entirety by reference.

FIELD OF THE INVENTION

The present invention refers to techniques for the production of food products, for example, sweet products formed by coupling together of complementary parts.

In particular, the present invention was developed with reference to methods and equipment in which the above-said complementary parts are transported on corresponding half moulds.

DESCRIPTION OF THE RELATED ART

Equipment for the production of moulded products in coupled moulds, as for example pralines, generally constituted of external chocolate shells or similar semi-processed parts, such as chocolate surrogate or wafer products, formed by external wafer shells, the first or the second possibly having a filling, generally follow a closed loop course formed by a double transport line on which the moulds containing the cavity or housing for the chocolate products are hinged.

A first critical point concerning these moulding equipments is the fact that after the mould-coupling phase, the line is 50% saturated. In fact, the space in the line occupied by the upper half-mould after coupling with the lower mould, is empty.

In addition, a second critical point is the scarce thermal exchange occurring in the un-moulding tunnel due to the fact that the cooling mass, constituted by the two coupled moulds, subtracts refrigerating energy from the product, which is the only part that needs to be refrigerated, to contract and facilitate product un-moulding.

In the application of the techniques previously referred to, coupling between complementary parts represents a very critical phase. This phase provides for a variation in the spatial orientation of the mould of one complementary part relative to the mould of the corresponding complementary part. Some prior art equipment of the type considered herein provide for a single production circuit in which the moulds of both complementary parts of the composite product travel on the same conveyor line through various workstations, realising successive phases in the formation of the complementary parts themselves. In this type of equipment, the complementary parts are located in alternating succession along the conveyor line so that when the station providing for their reciprocal coupling is reached, inverting means perform the turning over of the half mould of a complementary part onto the half mould of the corresponding complementary part so to form the composite product.

A coupling station of equipment as described above, is shown, for example, in the European patent EP 0 736 257 of the same Applicant, in which inverting means providing for a temporary involvement on the corresponding half-moulds of the complementary parts for the purpose of performing the turning over of one onto the other, are represented.

In the solution described in such prior art document, the half-moulds travel to the coupling station transported by the same conveyor line on which they are located, reciprocally spaced by an interval that can be indicated as the "step" of the conveyor line. The inverting operation provides for rotation of the half-mould of one complementary part around an axis that is transversal to the advancing direction of the conveyor line so that it is inverted above the half-mould of the corresponding complementary part, in such a way that the complementary parts are reciprocally coupled. As they exit the coupling station, the half-moulds assembled together are transported by the conveyor line, this time spaced from each other by an interval larger with respect to the above mentioned step, and in particular, by an interval equal to the sum of two times the dimension of the above described step and the dimension of the half-mould parallel to the advancing line.

The production capacity of equipment of the type described above is unavoidably limited and compromised by the half-mould coupling operations, for which the transport capacity of the conveyor line is not exploited in an optimal way along its entire length.

Furthermore, in this type of equipment, once the composite product is formed following the inverting operation and it is supported by only one of the half-moulds, both half-moulds of the complementary parts are sent in any case to the successive treatment and work phases provided for by the equipment on the composite product. The treatment phases successive to the coupling station frequently provide for a thermal treatment of the composite product, for example inside a refrigerating tunnel traversed by the conveyor line. Since also the half-moulds not supporting composite products traverse the refrigerating tunnel, a considerable percentage of power spent by the latter is used in the useless refrigerating of such half-moulds, in this way, considerably compromising the efficiency of the equipment.

Furthermore, since the distance between the half-moulds supporting the composite product on the conveyor line downstream from the coupling station is considerably larger with respect to the step that is used upstream of the latter, due to the previously-described inverting operations, the refrigerating tunnel can contain a considerably limited number of composite products with respect to the case in which the above said step was maintained also inside of the tunnel. It follows that the refrigerating thermal power generated inside of the tunnel is not exploited appropriately.

Another type of equipment for the production of food products formed by complementary parts coupled together provides for two different conveyor lines apt to respectively transport the half-moulds of each complementary part. An example of a coupling station for an equipment of this type is described in the European patent EP 0 583 739, of the same Applicant. The solution described in such document provides for the inverting of a first half-mould, located on a first conveyor line, onto a corresponding second half-mould, which is located on a second flanking conveyor line, therefore parallel and coextensive with the first one. The inverting operation described in the European patent under consideration (taken as a model for the preamble to claims 1 and 9) provides for the rotation of the first half-mould around an axis parallel to the advancing direction so that it is inverted onto the second half-mould and the complementary parts are reciprocally coupled. During the operation of the inverting means, the conveyor lines are temporarily stopped to allow the precise coupling of the half-moulds, avoiding the excessive manufacturing complications that the inverting means would require in the case in which contemporaneous advancement of the two conveyor lines and the inverting operation was provided for.

Consequently, the hourly production capacity of this type of equipment is drastically limited by the operations of the coupling station just described. Furthermore, the presence of the two conveyor lines flanking each other is heavily penalising in terms of the space occupied.

OBJECT AND SUMMARY OF THE INVENTION

The present invention has the object of overcoming the above-said disadvantages.

According to the invention, such object is achieved thanks to a method and corresponding equipment for the production of food products formed by the pairing of complementary parts, having the characteristics of claims 1 and 9 respectively.

The claims are an integral part of the technical disclosure provided herein relative to the invention.

The equipment described herein provides for the realisation of the complementary parts of the composite food product on two distinct production circuits, interfacing with each other in correspondence to a coupling station from which the composite product formed therein is then directed to successive treatment stations. In one form of embodiment of the invention, such composite-product treatment stations are provided on one of the two above-said production circuits.

In the equipment described herein, downstream from the coupling station, the flux of half-moulds supporting the composite product has a half-mould spacing step equal to that of the fluxes of half-moulds upstream to the coupling station on the two respective conveyor lines.

According to a preferred form of embodiment, the half-moulds are located along the two conveyor lines spaced from each other by the same step, which repeats for the entire length of the two conveyor lines. Furthermore, in the equipment according the present invention the operation of coupling the complementary parts is performed while the two conveyor lines are advancing.

Therefore, overall, the equipment described herein has a considerably potentiated hourly production capacity with respect to that of conventional equipments.

Furthermore, as was previously mentioned, the equipment according to a form of embodiment of the present invention provides for the composite product being transported by one of the half-moulds of the complementary parts, while the other half-mould continues on the corresponding conveyor line for the formation and transport of new complementary parts. In this way, the production circuit provided with stations apt to perform further treatments on the composite product can fully exploit the transport capacity of its own conveyor line. This is valid also for the potentiality of the successive treatment stations, for example, thermal treatment of the composite product, guaranteeing the optimal functional efficiency of the equipment.

BRIEF DESCRIPTION OF THE ATTACHED REPRESENTATIONS

Further characteristics and advantages of the equipment described herein will be evident in the course of the detailed description that follows, provided as a non-limiting example with reference to the only FIGURE attached, which schematically represents equipment for the production of food items.

DETAILED DESCRIPTION OF EXEMPLARY EMBODIMENTS

As is visible in the FIGURE of the drawing, the equipment described herein has two distinct production circuits 2, 3. Each production circuit has corresponding treatment stations traversed by a conveyor line 2', 3' that is specific for each circuit. The conveyor lines 2', 3' have a general loop-like path.

For example, the production equipment described herein can be equipment for the automated production of sweet products including a spherical wafer shell containing a creamy filling mass. These food products can be, for example of the type described in the European patent EP-A-0 083 324. The product under consideration is realised using two complementary moulds (or more correctly half-moulds) that, in practice, are formed by flat polygonal bodies (typically rectangular) each having a matrix made of a semi spherical cavity on a frontal surface. The cavities are predisposed to housing products such as, for example, hemispherical wafer shells apt to contain a creamy chocolate mass and other different components, which are applied inside the above said hemispherical shells.

With reference to FIG. 1, the production circuits 2, 3 have corresponding treatment stations apt to realising the above-said half-shell wafer provided with filling. Such wafer half-shells provided with filling constitute the complementary parts of the composite food product, realised through the equipment according to the present invention, which must be coupled.

The nature and type of treatment stations for realisation of the complementary parts do not constitute essential elements for the purpose of the present invention. In the example in FIG. 1, a zone 4 for the loading of wafer sheets 5 is provided upstream of both production circuits 2, 3, having a matrix for hemispherical shells which will later constitute the above-said hemispherical shells of the complementary parts. These wafer sheets are loaded onto half-moulds 6, 7, of the type described above, which are transported through production circuits 2, 3 respectively through respective conveyor lines 2', 3'.

In particular, the half-moulds 6, 7 are provided with cavities on their frontal surfaces 6A, 7A of dimensions such to house the wafer half-shells realising a coupling joint for reasons that will be explained later.

The half-moulds 6, 7 advance on the corresponding conveyor lines spaced one from the other by a distance defined as a conveyor line step. The step of the two conveyor lines 2', 3' is preferentially the same.

Furthermore, the above-said half-moulds are hinged on the corresponding conveyor lines around an axis 6', 7' (indicated with a point in FIG. 1, since it is perpendicular to the page) transversal with respect to the longitudinal extension of the conveyor line. Attachment of the half-moulds to the corresponding conveyor line is realised through conventional connecting means. Furthermore, such connecting means allow the constitution of a temporary connection so that it is possible to easily free the above-said half-moulds from the lines for the purpose of performing the normal washing and maintenance operations required for moulds used in the food industry.

A first station 8 provides for the cutting of the above-said hemispherical shells aimed at separating the hemispherical shells from the wafer carre' that was loaded on the half-mould. Next, in succession an aspirator 9A aspirates the wafer panel (carre'), crushed and without the hemispherical shell, and a pressing group 9B reconsolidates the hemispherical shells in their housing condition inside the cavity of the corresponding mould.

Next, two stations 10 are provided for the dosing of a sweet cream inside of the hemispherical shells. As can be seen in FIG. 1, the production circuit 3 has an additional station 11, in which dosing of an additional component inside of the half-shells is provided, in this case, a whole hazelnut.

The zones of the two production circuits described to this point can have any other configuration with respect to what was just described above, maintaining, in any case, the aim of realising complementary parts of a food product that can be coupled.

As can be seen in FIG. 1, the zones of the production circuits containing the above-described stations have a substantially horizontal extension. In particular, in FIG. 1, the zones just described are represented overlapping each other. However, it is possible to provide for, for example, such zones corresponding to the same support surface.

Successive to the zone for the production of complementary parts on the upper production circuit 2, the conveyor line 2' provides for inverting means 12 apt to rotating the half-moulds 6, around an axis transversal with respect to the advancing direction of the line. In the case represented in FIG. 1, the inversion consists of a rotation of approximately 180°, in such a way that the hemispherical shells carried by the moulds face downward, for a reason that will be described later.

The half-mould inverting operation is simple to perform since, as was previously mentioned, they are hinged onto the conveyor line around an axis 6' transversal to the longitudinal extending dimension of the conveyor line, which coincides substantially with the advancing direction of the line itself.

The production circuits 2, 3 interface in correspondence with a coupling station 13 apt to coupling together the complementary parts, with the aim of realising the composite product described above. In particular, relative to the upper production circuit 2, such coupling station is located after the inverting means 12, while relative to the lower production circuit 3, after the zone for the production of complementary parts.

In correspondence to the coupling station 13, the conveyor lines 2', 3' are coextensive and the half-moulds 6, 7 have their corresponding frontal surfaces 6A, 7A facing each other.

This is obtained thanks to the inverting operation performed by the means 12 on the half-moulds 6 and by the reciprocal position between the conveyor lines 2', 3'.

In fact, in the case of FIG. 1, the half-moulds 6 are rotated by the means 12 in such a way that the frontal surfaces 6A of the half-moulds 6 face downward in correspondence to the coupling station 13 where they are facing the front surfaces 7A of the half-moulds 7 since the conveyor lines 2', 3', in correspondence with such coupling station 13, are superimposed so that the half-moulds 7 are under the half-moulds 6, with their frontal surfaces 7A facing upward.

Instead, in other possible forms of embodiment the half-moulds 6 and/or 7 can be provided connected to the corresponding conveyor lines 2', 3' as plates of a conveyor belt. In this case, for example in the case of the upper conveyor line 2', the inversion of the half-moulds 6 from the position in which the frontal surfaces with the product-housing cavities face upward to the position in which such frontal surfaces face downward (inversion corresponding to a 180° rotation of the half-moulds around an ideal axis orthogonal to the conveyor line of the half-moulds 6) does not require the use of an inverter, but it simply derives from the fact that the conveyor line 2' describes a C-like trajectory as is visible in the upper left part of FIGURE in the attached drawing.

In any case, when the half-moulds 6 are inverted so to turn the frontal surfaces 6A downward the half-shells are retained inside the cavities of the half-moulds, thanks to the interference fitting described above, realised between the half shells and such cavities.

In the coupling station 13, the half-moulds oriented on the corresponding conveyor lines as described above are then coupled so to allow the connecting together of the complementary parts and to realise the composite product described above. Such coupling operation is performed at the same time that the half-moulds are advancing on both lines of the circuits and consists of bringing the half-moulds 6, 7 close together according to a relative movement which is substantially vertical in the particular case in the FIGURE, so to bring them into reciprocal contact in correspondence with their respective frontal surfaces on which the complementary parts are housed. The complementary parts on the half-moulds 6 of the upper conveyor line 2' are then released from their corresponding half-moulds to be applied onto the corresponding complementary parts travelling on half-moulds 7 of the conveyor line 3'. Pushing elements (of known type) can be used, with the aim of detaching the complementary parts contained on the half-moulds 6. At the same time, the conveyor line 2' of the half-mould 6 follows a trajectory distancing it from the conveyor line 3', with the aim of distancing the mould 6 from the complementary part that it was previously transporting. The fact that one conveyor line moves away from the other conveyor line downstream from the coupling station, where otherwise the two lines converge in a coextensive and mutually facing way, allows the quick and easy removal of the corresponding half-mould once the complementary parts are coupled, so to allow the complementary parts to be sent to the composite product-treatment stations that will be described in the following, carried by only one of the two half-moulds.

In the equipment described herein, the operation of coupling the complementary parts provides for a reciprocal approaching movement of the half-moulds, as the conveyor lines are advancing. Therefore, such operation does not seriously compromise the hourly production capacity of the equipment.

In the production of composite products that contain a substantially liquid filling product, the solution described herein provides for the inverting means 12 being located in correspondence to the coupling station 13 so that the inverting operation, performed on the complementary parts containing the filling, is immediately followed by a coupling of the complementary parts to avoid losses of the filling product due to the force of gravity. For example, in an equipment configuration shown in the FIGURE, the rotation of the half-moulds 6 is performed, in correspondence with the coupling station, with an angular acceleration so that the liquid filling is subjected to acceleration forces opposing the force of gravity acting on it so that the filling product remains inside the corresponding complementary part until they are coupled.

For the production of composite products having a creamy or very viscous filling, it is possible instead to provide for the inverting operation of the first half-moulds, or in general of the half-moulds of one of the two conveyor lines, being realised, as was already described, through the effect of the movement of the corresponding conveyor line, on which the half moulds are connected like plates of a conveyor belt, following a C-like trajectory.

As can be seen in FIG. 1, upon exiting from the coupling station 13, the composite product is transported by the half-mould 7 of the production circuit 3, while the half-moulds 6 of the circuit 2 advance with the conveyor line 2' of the circuit 2 for the loading of new wafer sheets, following an additional inversion (with the possible employment of an additional inverter, not shown) so to return their frontal surfaces to the upward-facing position.

The composite products realised thusly are then sent to the successive treatment stations, which in the specific example of FIG. 1 include a thermal treatment tunnel such as a refrigerating tunnel 14 apt to refrigerate the products.

In the equipment described herein, the flux of composite products leaving the coupling station 13 has a step between the half-moulds 7 corresponding to the step characteristic of both conveyor lines of the equipment.

Furthermore, in the equipment described herein, the treatment stations of the composite products are traversed only by the half moulds apt to support the composite products.

In the particular case illustrated in FIG. 1, the refrigerating tunnel 14 is traversed only by the half-moulds 7 transporting the composite products previously formed. In this way, wasting of thermal refrigerating power deriving from the needless refrigeration of masses other than the composite products is considerably reduced. In fact, the refrigerating action involves only the half-moulds 7 supporting the composite products and not the half-moulds 6, which do not enter the tunnel 14.

Furthermore, since—as was previously said—the step between half-moulds transporting the composite products is maintained equal to the value of the step chosen for the entire length of the equipment conveyor lines, the refrigerating tunnel can simultaneously contain, depending on the design choice of the step of the equipment, a maximum number of half-moulds so to guarantee the maximum functional efficiency of the refrigerating tunnel. All of this, with beneficial effects also relative to the advancing velocity of the half-moulds 7 containing the products, the velocity can actually be reduced to approximately half, keeping the same number of treated products per unit time.

Upon exiting the refrigerating tunnel 14, the composite products are unloaded from the half-moulds 7 in correspondence to a station 15, and the half-moulds are brought back in correspondence to the loading station 4 to receive new wafer panels.

The solution described herein also provides for forms of embodiment in which the half-moulds 6 are left in the position attained in the coupling station 13 also while traversing the composite product-treatment stations, such as, for example, the refrigerating tunnel. In the case, for example, of the refrigerating tunnel, the composite product is thermally conditioned within the mould formed by the two half-moulds 6 and 7.

The half-moulds 6 are then removed as previously described only upon exiting from the tunnel 14.

Such form of embodiment can be advantageous in cases in which the uncoupling of the half-moulds 6 from the corresponding complementary parts can only be realised following a treatment phase of the composite product, such as, for example, a refrigerating phase, with consequent consolidation of the product. A typical example of a product for which it is preferable to resort to this solution is constituted by hollow chocolate eggs.

In the equipment represented in FIG. 1, the conveyor lines 2', 3' are represented superimposed in correspondence to the coupling station 13, and at the same time, the means 12 for inverting the half-moulds 6 provide for a rotation around an axis transverse to the advancing direction so that the frontal surfaces of the half-moulds 6 face downward.

However, variations and modifications of the configurations of the conveyor lines in correspondence to the coupling zone, as well as for the operations of the inverting means, can be provided for, as long as they reproduce, in any case, the characteristic in which the frontal surfaces of the half-moulds are reciprocally facing in correspondence to the coupling station. In this way, the coupling station is susceptible to realising a simple moving together of the half-moulds according to a relative movement of linear translation.

In addition, the equipment described herein provides for the location of the production circuits described above in a reciprocal configuration with minimum bulk. For example, in the case illustrated in FIG. 1, the upper production cycle 2 is located so to be included within the surface area occupied by the lower production circuit 3. It is possible to provide for additional variants of the location of the two circuits, maintaining invariant the fundamental characteristics of the equipment according to the present invention.

Naturally, keeping the principle of the invention constant, the details of construction and the forms of embodiment could be varied widely with respect to what was described and illustrated, without departing from the field of the present invention, as defined in the following claims.

The invention claimed is:

1. A method for the production of food products comprising a wafer shell that contains a creamy filling mass and is formed by complementary parts coupled together, the method comprising:
   locating wafer sheets having a matrix of said complementary parts in a first and second half-moulds, said first and second half-moulds having corresponding frontal surfaces with cavities configured to house said complementary parts;
   advancing said first and second half-mould on first and second conveyor lines respectively;
   separating said complimentary parts housed within said cavities of said first and second half-moulds from said wafer sheets;
   coupling said complementary parts in correspondence with a coupling station inverting at least one between said first and second mould so to bring said first and second half-mould into a configuration in which said frontal surfaces of said half-moulds are reciprocally facing;
   after the coupling of said complementary parts, removing one of said first and second half-moulds so that the reciprocally coupled complementary parts are left on the other of said first and second half-moulds; and
   after the removal of the one of said first and second half-moulds, thermally conditioning the reciprocally coupled complementary parts left on the other of said first and second half-moulds;
   wherein said first and second conveyor lines have a general loop path with corresponding sections of the loop trajectories mutually facing in correspondence with said coupling station, and said at least one between said first and second half-mould is inverted around an axis transverse to the advancing direction of the corresponding conveyor line.

2. The method of claim 1, wherein said first conveyor line brings the corresponding complementary parts above the complementary parts of said second conveyor line.

3. The method of claim 2, wherein the inverting at least one between said first and second mould comprises, before coupling said complementary parts, rotating said first half-mould so as to turn the frontal surface of the first half-mould downward.

4. The method of claim 3, wherein said coupling of said complementary parts comprises said first and second half-moulds approaching each other according to a relative linear movement.

5. The method of claim 1, wherein the coupling of said complementary parts comprises releasing elements acting on the complementary parts of one of said first and second half-moulds to free the complimentary parts from the corresponding half-mould.

6. The method of claim 1, wherein said complementary parts are on said first and second half-moulds.

7. The method of claim 1, further comprising, before coupling said complimentary parts, dosing an ingredient inside said complementary parts.

8. Equipment for the production of food products comprising a wafer shell that contains a creamy filling mass and is formed by complementary parts coupled together, the equipment comprising:
   first and second half-moulds configured to receive wafer sheets having a matrix of said complimentary parts, said first and second half-moulds having corresponding frontal surfaces with cavities configured to receive said complementary parts;
   a first and second conveyor line configured to transport the first and second half-moulds respectively, said first and second conveyor lines being coextensive for at least a corresponding portion;
   a cutting station provided in correspondence with said first and second conveyor lines and configured to separate said complimentary parts from said wafer sheets;
   a coupling station configured to couple said complementary parts and provided in correspondence to said coextensive portions;
   a removal means configured to remove one of said first and second half-mould so that the coupled complementary parts are left on the other of said first and second half-moulds, wherein the removal means is downstream from said coupling station; and
   a thermal conditioning station downstream from said coupling station, wherein the thermal conditioning station is traversed by only one of said first and second conveyors, and the one of said first and second conveyors carries said other of said first and second half-moulds;
   wherein said first and second conveyor lines have a general loop pattern configured such that, in correspondence with said coupling station, said first and second conveyor lines have mutually facing corresponding portions of their loop trajectories.

9. The equipment of claim 8, further comprising an inverting means upstream from said coupling station, provided on at least one of said first and second conveyor lines, and configured to rotate the half-moulds of the corresponding conveyor line around an axis transversal to the advancing direction so that said frontal surfaces of said half-moulds are mutually facing in correspondence with said coupling station.

10. The equipment of claim 9, wherein said inverting means is configured to rotate said first half moulds so as to turn said frontal surfaces of said first half-moulds downward.

11. The equipment of claim 9, wherein said coupling station is configured such that said first and second half-moulds approach each other according to a relative linear movement.

12. The equipment of claim 8, wherein said first conveyor line extends, at least partially, above said second conveyor line.

13. The equipment of claim 12, wherein said first conveyor line is located so as to be included within the surface area occupied by said second conveyor line.

14. The equipment of claim 8, wherein said first conveyor line is located so as to be included within the surface area occupied by said second conveyor line.

15. The equipment of claim 8, wherein said first and second half-moulds are located on said first and second conveyor lines respectively spaced by the same step that is kept constant for the entire length of the corresponding conveyor line.

16. The equipment of claim 8, wherein said first and second half-moulds are hinged on said first and second conveyor lines respectively, around an axis substantially transversal to the direction of longitudinal extension of the corresponding line.

17. The equipment of claim 8, wherein said coupling station provides elements for the releasing of complementary parts from one of said first and second half-moulds.

18. The equipment of claim 8, further comprising treatment stations configured to perform successive phases in the formation of said complementary parts on said first and second half-moulds.

19. The equipment of claim 8, further comprising a dosing station configured to dose at least one ingredient inside said complimentary parts, in correspondence of each of said first and second conveyor lines.

* * * * *